2,856,327
LACTATE-LACTOBIONATE COMPOSITION FOR TREATMENT OF BOVINE KETOSIS

Joseph C. Shaw, Washington, D. C., and John J. Jonas, Islip, N. Y., assignors, by mesne assignments, to National Dairy Products Corporation, New York, N. Y., a corporation of Delaware No Drawing. Application March 19, 1956
Serial No. 572,239

12 Claims. (Cl. 167—53)

This invention relates to a lactate-lactobionate composition for the treatment of bovine ketosis, and to a process for treating bovine ketosis by administration of a calcium-sodium-ammonium lactate-lactobionate composition.

It has been estimated that the economic loss due to ketosis (otherwise called acetonemia) in dairy cattle amounts to $9,000,000 per year in milk loss and veterinary fees. Ketosis affects cows of all ages. The overall incidence varies from 5 to 15%, usually, but occasionally even 40% of one herd may suffer one or more attacks. The disease is seasonal, being most prevalent between November and May, and usually occurs ten days to six weeks after calving, with only occasional cases reported when the cows are on summer pasture.

The most common symptoms are a rapid decrease in milk production and a loss of weight. Appetite may be poor or depraved, and there is usually rumen inactivity and constipation. The cow may become depressed, appearing wild and easily frightened. In some of the nervous cases the back may be arched, and incoordination, particularly of the hind legs, may also occur.

The blood picture is most revealing, and usually is utilized in determining the effectiveness of the treatment. During ketosis, the blood will show a decrease in sugar and an increase in ketones; hence the name. The blood sugar level may drop from a normal of about 45 to 60 mg. per 100 ml. to a low of about 20 mg. per 100 ml., while the ketones increase from the 3 to 6 mg. per 100 ml. norm to a higher of 60 to 70 mg. per 100 ml. Post-mortem examination of deceased cows shows a fatty liver, and there may also be some degeneration of certain endocrine glands, such as the pituitary and adrenal cortex.

The Ross urine test which tests for acetone in the urine is the common diagnostic test for ketosis. Ammonium sulfate containing 1% sodium nitroprusside is added to 5 ml. of urine. When this has dissolved, a flake of sodium hydroxide is introduced. The intensity of the purple color of the solution indicates the severity of the ketosis, an absence of color indicating no ketosis.

Several methods have been suggested for the treatment or prevention of ketosis. The administration of corticoids, such as cortisone, hydrocortisone and ACTH, and of glucocorticoids such as metacortandracin and 9-δ-fluorohydrocortisone has been shown to be effective. Shaw, Hatziolos and Chung, "Studies on Ketosis in Dairy Cattle. XV. Response to Treatment with Cortisone and ACTH," Science, 114: 575–576 (1951), Shaw, Gessert and Chung, "Studies on the Etiology and Treatment of Ketosis in Dairy Cows," Proc. Am. Vet. Med. Assn., August 23–26 (1954), p. 78–81, Shaw, Hatziolos, Leffel, Chung and Gilbert, "Studies on Ketosis in Dairy Cattle. XVI. The Pituitary-Adrenal Cortical Syndrome," N. Am. Vet., 34: 251–256 (1953), Shaw, Hatziolos, Leffel, Chung, Gill and Gilbert, "Pituitary-Adrenal Cortical Syndrome in Ketosis of Dairy Cows," Md. Agr. Exp. Sta. Misc. Cir., 139, pp. 1–19 (1952), Shaw, Ozanlan, Christiansen and Righetti, "Studies on Ketosis in Dairy Cattle. XIX. Glucocorticoids and ACTH Therapy in the Los Angeles Area," J. Am. Vet. Med. Assn., in press, and Shaw et al., Miscellaneous Publication No. 238, June 1955, University of Maryland. However, this treatment is expensive. Massive daily doses, of the order of 1500 mg., usually have been required, and each dose is therefore costly. At the present time, such a treatment is impractical for large herds.

Seekles, Veterinary Record, 63, 494 (1951), describes the use of ammonium lactate in the treatment of ketosis. He indicates that such therapy has been practiced since 1942 in numerous cases in The Netherlands, and as a rule with good results. However, the ammonium lactate has a diarrhetic effect, and the ammonium ion is ketogenetic and therefore tends to offset any effectiveness due to the lactate radical. The ketogenicity of ammonia has been reviewed by Greenberg (Chemical Pathways of Metabolism, volume 1, page 337).

Sodium propionate is presently being offered as an effective preventative agent for ketosis, and for this purpose is administered in dairy feeds. However, the propionate is unpalatable to the cow, so that the limit of addition which is acceptable to the cow is insufficient to afford satisfactory prevention.

In order for a substance to be useful as a preventative or cure for bovine ketosis, in addition to its therapeutic effect, it should also have a satisfactory flavor characteristic, so that it can be fed to the cow in the feed in the quantity necessary to effect a cure. It should have no undesirable side effects, and in particular should not be diarrhetic. Its physical characteristics should be such that it can readily be mixed with the feed, and will be highly soluble, so that it can be administered as a drench to animals which have already reached a stage where they refuse their feed.

In accordance with the invention, a lactate-lactobionate composition is provided having an optimum palatability to the cow, a high water solubility, and a high stability against gelling or "setting up" in aqueous solution. The composition of the invention is particularly effective as a cure, but it can also be used as a preventative in satisfactory amounts without undesirable after effects, such as diarrhea.

The composition of the invention consists essentially of a lactobionate salt, which can be calcium lactobionate alone, or admixed with one or more water-soluble lactobionates selected from the group consisting of sodium lactobionate and ammonium lactobionate, and a lactate salt, which can be calcium lactate alone, or admixed with one or more lactate salts selected from the group consisting of sodium lactate and ammonium lactate. The lactate salt of the composition comprises at least 15% up to 100% calcium lactate, and the lactobionate salt comprises at least 15% up to 100% calcium lactobionate. A preferred lactate salt mixture contains from 15 to 85% calcium lactate and from 85 to 15% total sodium lactate and/or ammonium lactate, and with this the lactobionate salt is preferably 100% calcium lactobionate.

The lactobionate and lactate salts are present in the composition of the invention in amounts within the range from 70 to 85% lactate and from 30 to 15% lactobionate, to give a composition pH in a 10% aqueous solution at 25° C. within the range from 5 to 6, preferably about 5.5. At a pH in excess of 7, the stability of aqueous solution of the composition is considerably decreased, and at a pH below 5 the compositions cannot be administered beneficially, because of possible adverse effects upon the cow metabolism.

The composition in accordance with the invention is administered orally by mixing in the feed, or as a drench, or in capsule or bolus form. The composition is particularly well suited for administration as a drench, inasmuch as aqueous solutions thereof are stable for several hours before setting up of calcium lactate in the form of calcium lactate pentahydrate. The physical condition of the composition is not critical.

The composition can be prepared by simple mixing in aqueous solution of lactobionic acid lactobiono-δ-lactone of a lactobionate salt with lactic acid or calcium lactate or a mixture of calcium-sodium and/or-ammonium lactates. Alternatively, lactic acid can be mixed with lactobionic acid or its δ-lactone in aqueous solution. Calcium, sodium or ammonium hydroxide, or lactic acid, as required by the initial pH, are added to the solution in an amount to adjust the pH thereof to within the stated range of from 5 to 6, and to obtain the desired ratio of the various salts of the acids present. The aqueous solutions can be used as such. If a dry composition is desired, they can be spray-dried.

If a very pure composition is desired, the starting materials should be U. S. P. grade. However, in many instances a less pure, commercial material will be satisfactory, and in this event the starting materials can be utilized in various forms, according to their grade, availability and cost.

Sodium lactate is available as a 50% aqueous solution and would usually be used in this form. Solutions containing less water are quite resinous, and are not readily mixed with other materials. Pure ammonium lactate, like sodium lactate, also is a liquid or resinous material, and usually is supplied as a 75 to 80% aqueous solution.

In the following discussion, it will be understood that the corresponding ammonium compounds can be substituted in whole or in part for the sodium compounds referred to.

The product also can be prepared by dissolving calcium lactate pentahydrate and calcium lactobionate or lactobionic acid or lactobiono-δ-lactone in water with the aid of sodium carbonate or sodium sulfate. The excess calcium can be eliminated by the formation of a precipitate of calcium sulfate or calcium carbonate, and the sodium salt can be added in an amount to produce a mixture of sodium and calcium lactates and lactobionates in the final product in the desired proportion. The solution can be filtered to remove the calcium precipitate, and then used as such. It can be spray-dried, if desired.

A delactosed, deproteinated whey also can be used as a starting material. The preparation of such a whey is described in the Weisberg et al. Patent No. 2,071,368, dated February 23, 1937. Lactobionic acid or its δ-lactone is added. This product is neutralized with calcium hydroxide, or with calcium and sodium hydroxides in the proportions to give the desired sodium lactate-calcium lactate-lactobionate ratio, and the product spray-dried.

For drenching, this composition can be dissolved directly in water. It can also be administered with a feed. The amount of the composition of the invention which can be administered with the feed is not critical, but enough would be used to obtain the desired preventative or curative effect, while at the same time not administering excessive amounts, i. e., amounts in excess of two pounds of calcium lactate and one pound of sodium lactate per animal per day. Usually, an amount in the range from about 5 to about 15% in the feed is satisfactory for a good preventative effect.

For administration with the feed, a finely granular material is better than a finely ground or dusty material. Cows frequently object to a dusty composition. The granular material also is better for drenching purposes, and for mixing and pouring. Fine powders produced by spray-drying or by attrition of a spray-dried powder can be agglomerated by steaming. The material is sent through a tunnel dryer, wherein steam is admitted under whose influence the powder is wetted and the particles fuse and coalesce together, forming granules as they pass through the dryer.

A composition containing calcium lactobionate and calcium lactate can be used for the treatment of bovine ketosis with both a preventive and curative effect in treating mild cases. The presence of the lactobionate acts to solubilize the calcium lactate, which alone is only very slightly soluble in water. Thus, whereas calcium lactate alone is difficult to administer in a sufficient quantity, without also adding tremendous quantities of liquid, the composition of the invention, containing calcium lactobionate in addition, does not have this defect. The calcium lactate is solubilized to a sufficient extent to obtain a proper curative effect in most cases.

Sodium lactate is soluble in water, is an effective cure for ketosis, and will result in marked increases in blood sugar, using healthy fistulated cows as the experimental animals. However, the administration of sodium lactate, like the administration of ammonium lactate, results in drastic diarrhea, which is an unfortunate side-effect making it impossible to utilize this material by itself. Moreover, sodium lactate is a liquid, which makes its administration in feeds more difficult.

A composition with calcium lactate and sodium and/or ammonium lactate in accordance with the invention is completely soluble in water, the relative insolubility of calcium lactate not being evident. At the same time, the mixture is fully palatable to the cow, and there are none of the after-effects which would be expected due to the presence of sodium and/or ammonium lactate. Thus, the combination of these materials is superior to either material alone, because of the unexpectedly high palatability, solubility and absence of after-effects, and can be effectively used both for preventative and for curative treatment.

In the case of preventative treatment, the composition of the invention would be mixed in the feed in the amount of about 5 to about 15% by weight, although as much as 25% can be used. This ration then is fed to the cows, starting approximately a week after parturition and continuing for up to three weeks after calving. A typical calving ration is as follows:

| | Lbs. |
|---|---|
| Ground corn | 590 |
| Ground oats | 500 |
| Wheat bran | 500 |
| Linseed meal | 360 |
| Bone meal (or other safe phosphorus supplement) | 20 |
| Ground limestone | 10 |
| Salt | 20 |
| Total | 2,000 |

Digestible protein, 13.3%
Total digestible nutrients, 71.8%

The compositions of the invention and their use are shown in the following examples which represent the best mode in the opinion of the inventors of their invention:

EXAMPLE 1

Two parts (by weight) of calcium lactate pentahydrate and one part (by weight on the solid basis) of 50% solution of sodium lactate and one part (by weight on the solid basis) of lactobionic acid 60% aqueous concentrate were mixed, and heated with continuous stirring in a jacketed reaction vessel. The solid calcium lactate formed a melt with the other ingredients, and finally a homogeneous fluid, optically transparent, very slightly yellow mass was formed.

The solids content of this composition was recovered by spray drying. During the drying process the following conditions were maintained: inlet temperature 310°–315° F., outlet temperature 185°–190° F., feed rate 8 gallon/hour, feed temperature 150–160° F., through a high pressure nozzle.

A snow-white, non-crystalline, free-flowing powder was obtained which had the following analytical composition:

| | |
|---|---|
| Sodium _____percent__ | 5.99 |
| Calcium _____do____ | 8.12 |
| Lactate _____do____ | 57.50 |
| Lactobionic acid and lactone _____do____ | 21.20 |
| Moisture _____do____ | 5.2–6.0 |
| pH in percent aqueous solution _____ | 5.5 |

This material formed aqueous solutions with extreme ease when shaken with water. These solutions were entirely transparent and practically colorless. These liquids represent stabilized, supersaturated solutions of calcium lactate, and are suitable for drench administration for the ketotic cow.

The taste of the solutions was devoid of the sharp, bitter flavor characteristic which is an inherent property of calcium lactate solutions. The solutions were readily accepted by the sick animals.

These solutions were stable (fluid, devoid of crystalline or other solid material) to such an extent that enough time was left for the veterinarian, or for persons performing the drenching operation, to administer the fluid before extensive crystallization or semisolidification to a gel could occur.

The stability of the solutions, in the above sense, is demonstrated by the following table. The data in this table compare calcium sodium lactate and calcium lactate solutions.

Table 1

| Concentration, weight/vol., percent of materials | Time, after which solidification of the solution is observed at 70° F., by various materials | | |
|---|---|---|---|
| | Calcium-Sodium Lactate-Lactobionate as in Example above | 2 parts Calcium Lactate 5H²O– 1 part Sodium Lactate | Calcium Lactate |
| 10_____ | solutions remain fluid indefinitely. | solutions remain fluid indefinitely. | no clear solution is formed. |
| 15_____ | _____do_____ | _____do_____ | Do. |
| 20_____ | 2–4 hours_____ | 30 minutes_____ | Do. |
| 25_____ | 1–2 hours_____ | 10 minutes_____ | Do. |
| 30_____ | 3–15 minutes___ | no clear solution is formed. | Do. |

EXAMPLE 2

106.9 lbs. of calcium lactate pentahydrate, 50 lbs. of sodium lactate (50%) 75.2 lbs. lactic acid (50%), 11.4 lbs. sodium hydroxide and 44.5 lbs. calcium lactobionate were mixed and by controlled heating the ingredients were brought to the form of a homogeneous melt or solution. The liquid was brought to dryness by spray-drying as in Example 1. The recovered white material had the following composition:

| | |
|---|---|
| Sodium _____percent__ | 5.96 |
| Calcium _____do____ | 8.18 |
| Lactate _____do____ | 58.28 |
| Lactobionic acid+lactobionolactone _____do____ | 21.5 |
| pH in 10% aqueous solution _____ | 5.5 |

The solubility and stability properties of this material were found to be the same as those described in Example 1.

EXAMPLE 3

59.33 lbs. of calcium lactate pentahydrate, 121.75 lbs. lactic acid (50%), 19.5 lbs. sodium hydroxide and 45.75 lbs. calcium lactobionate were mixed and by controlled heating the ingredients were brought to the form of a homogeneous melt or solution. The liquid was brought to dryness by spray-drying as in Example 1.

This material had the following analytical composition:

| | |
|---|---|
| Sodium _____percent__ | 6.62 |
| Calcium _____do____ | 6.99 |
| Lactate _____do____ | 58.2 |
| Lactobionic acid + lactobionolactone _____do____ | 20.0 |
| pH in 10% aqueous solution _____ | 5.5 |

Solubility properties of this material composition were similar to that described in Example 1.

The aqueous solution of this preparation remained fluid for 2 hours at 30% solids at 70° F.

EXAMPLE A

Two permanently fistulated, non-lactating and non-pregnant cows, representing the Jersey and Holstein breeds, were used as experimental animals. They were fed according to Morrison's requirements, Feeds and Feeding, 21st edition (1948) on a ration of 8 lbs. alfalfa hay and 6 lbs. of a 16% protein concentrate mixture. The concentrate ration was fed twice daily except on days of experimental trials, when the morning feeding was omitted. Hay was fed only in the evening and in controlled amounts to insure complete consumption by 12 midnight. On trial days, water was withheld from the animals starting at 12 midnight and ending at 4:30 a. m., at which time they were allowed access to water for approximately 0.5 hour. The water then was removed and an interval of approximately 3.5 hours was allowed before the start of the trial. This interval should have allowed sufficient time for the ingested water to reach an equilibrium within the animal. After the morning watering, the animals did not receive water until the end of the trial period. The cows remained at approximately constant weight and were in "good health" throughout the entirety of the study.

Rumen liquor samples (500 ml.) were obtained via the fistula with the aid of a metal tube and rubber hose connected to an aspirator pump. Samples were taken prior to administration of substrate and at various intervals following substrate addition. Immediately after removal, the rumen liquor was strained through two layers of cheesecloth and then centrifuged at 1000 R. P. M. for 15 minutes to remove the residual feed particles. Several aliquot samples of the resultant supernatant liquid were preserved and saved for lactic acid and volatile fatty acid analyses. Samples for lactic acid determination were preserved by adding 0.1 ml. of 100% (w./v.) trichloroacetic acid to 1 ml. of rumen fluid. Samples for volatile fatty acid determinations were preserved by adding 1 ml. of a saturated mercuric chloride solution to 9 ml. of rumen fluid. In the single experiment concerning in vitro dissimilation of sodium lactate, the cell suspension method of Doetsch et al., Maryland Agr. Expt. Stat. Misc. Pub., 238, 1 (1955) was employed.

The following methods of analysis were used: rumen and blood lactic acid, Barker and Summerson, J. Biol. Chem., 138, 535 (1941), volatile fatty acids, Keeney, Maryland Agr. Expt. Stat. Misc Pub., 238, 23 (1955), blood glucose, Somogyi, J. Biol. Chem., 100, 695 (1933), modification of the Shaffer-Hartmann method.

All substrates used in this study were diluted with water to a volume of 1.5 to 2.0 liters and were then administered via the rumen fistula. The various forms of lactates used were as follows: Trial 1, 3 lbs. calcium lactate and 3 lbs. calcium lactobionate, and trial 2, 3 lbs. calcium lactate and 1 lb. calcium lactobionate. The pH of each of these solutions was 5.5.

A summary of the results of trials 1 and 2 is presented in Table II.

Table II

TRIAL 1 (3 LBS. CALCIUM LACTATE AND 3 LBS. CALCIUM LACTOBIONATE)

| Sampling time (hours) | Total VFA ($\mu$M/ml.) | Molar percent of total VFA | | | | Rumen fluid lactic acid ($\mu$M/ml.) | Blood lactic acid (mg. percent) | Blood glucose (mg. percent) |
|---|---|---|---|---|---|---|---|---|
| | | Acetic | Propionic | Butyric | Valeric plus higher acids | | | |
| 0 | 52.5 | 68.4 | 14.8 | 12.6 | 4.2 | 5 | | 42.0 |
| 0.5 | 53.3 | 63.3 | 20.8 | 11.9 | 4.0 | 139 | | 49.3 |
| 2 | 67.6 | 56.8 | 27.1 | 13.1 | 3.0 | 111 | | 39.9 |
| 5 | 66.0 | 56.0 | 26.1 | 14.1 | 3.8 | 46 | | 34.5 |
| 8 | 53.1 | 62.2 | 21.1 | 12.1 | 4.6 | 15 | | 43.7 |

TRIAL 2 (3 LBS. CALCIUM LACTATE AND 1 LB. CALCIUM LACTOBIONATE)

| 0 | 94.6 | 69.1 | 15.4 | 11.6 | 3.9 | | 19.6 | 47.7 |
|---|---|---|---|---|---|---|---|---|
| 0.5 | 88.5 | 65.4 | 18.4 | 12.9 | 3.3 | 139 | 14.0 | 46.8 |
| 5 | 127.0 | 46.0 | 25.9 | 25.1 | 3.0 | 83 | 12.6 | 44.2 |
| 9 | 121.1 | 48.1 | 23.5 | 24.5 | 3.9 | 74 | 14.8 | 53.1 |
| 12 | 112.8 | 56.4 | 19.8 | 19.3 | 4.5 | 28 | 8.8 | 43.5 |

The administration of calcium lactate resulted in a marked increase in propionic acid and a decrease in acetic acid within 2 to 5 hours. An increase in butyric acid occurred after 5 hours during trial 2 but not in trial 1. In both trials there were slight but insignificant changes in valeric plus higher acids. The increases in total VFA were approximately 14 to 39 $\mu$M/ml. for trials 1 and 2 respectively, and reached this peak in 5 hours. It should be noted that the administration of calcium lactate in combination with calcium lactobionate did not, in any instance, cause a significant increase in blood lactic acid or blood glucose. The initially high blood lactic acid value in trial 2 is attributed to an excitation of the experimental animal at the time the blood sample was drawn. In these trials, the decreases in rumen fluid lactic acid cannot be attributed to direct absorption. However, these decreases can be explained largely by assuming lactate dissimilation and normal passage from the rumen of ingesta containing the substrate.

The following data are typical of that obtainable when calcium lactate is administered per os as a treatment for bovine ketosis. The studies of all involved the administration of calcium lactate by drench to insure that all cows received the prescribed dosage. The dosage and duration of treatment were varied to obtain information on the optimum for both. As noted under "Response" in the table, calcium lactate was highly effective when given at a level of 2 lbs. on the first day and 1 lb. per day for 7 to 8 days, 14 of 16 cows showing good recovery. Treatment for shorter periods of time were not as effective, although most of the cows exhibited good initial responses.

Table III.—*Efficiency of calcium lactate per os for the treatment of ketosis*

| No. of Cows | Lactate Dosage | Response | Blood Glucose (G) and Urine Ketone Qualitative (K) on days Post-Treatment | | | |
|---|---|---|---|---|---|---|
| | | | 0 | 1 | 4-6 | 7-10 |
| 14 | 2 lbs. on 1st day and 1 lb. for 7-8 days. | Good Recovery | G 29.4<br>K 3.8 | 37.8 | 42.0<br>1.7 | 44.8<br>0.7 |
| 2 | do | Good Clinical Response—Retreated. | G 16.4<br>K 4.0 | 17.4<br>4.0 | 18.4<br>3.5 | 27.0<br>3.0 |
| 1 | 2 lbs. on 1st day and 1 lb. for 5 days. | Good response and Relapse. | G 34.1<br>K 4.0 | | 40.2 | 26.6<br>3.0 |
| 3 | 2 lbs. on 1st day and 1 lb. for 4 days. | Good Response—No retreatment. | G 20.7<br>K 4.0 | | | 34.0<br>1.3 |
| 2 | 2 lbs. on 1st day and 1 lb. for 3 days. | Good Response | G 19.9<br>K 4.0 | | 37.0<br>3.0 | |
| 3 | 1 lb. on 1st day and ½ lb. for 4-6 days. | Good Response—No Retreatment. | G 20.5<br>K 4.0 | 20.6<br>4.0 | 36.0<br>2.7 | 37.3<br>2.0 |

Calcium lactate was palatable at 5 to 10% levels in the feed of Example 1, and at 20% levels when compressed into pill form and mixed into the grain. Each administration was by drench, per os.

EXAMPLE B

The following data are typical of that obtainable using mixed calcium and sodium lactates. Administration was per os of a 20% aqueous solution.

Table IV.—*Three cows treated with combination of calcium lactate pentahydrate and sodium lactate (Ca—Na ratio 1:1) on first day and either a combination or calcium lactate thereafter*

| Cow | Treatment (per os) | Blood Glucose in Mg. Percent (G) and Qualitative Urine Ketones (K) [1] | | | | Comments |
|---|---|---|---|---|---|---|
| | | Day of Treatment | Days Post-Treatment | | | |
| | | | 1 | 4-6 | 7-11 | |
| Veldhius | ¾ lb. sodium lactate plus 1¼ lb. calcium lactate on first day followed by ½ lb. calcium lactate for 11 days. | (G) 27.0<br>(K) 4 | 31.0<br>4 | 36.1<br>3 | 43.0<br>1 | Good Recovery. No adverse effect. |
| Clanton | ¾ lb. sodium lactate plus 1¼ lb. calcium lactate plus ½ that amount of each on following day. | (G) 44.0<br>(K) 3 | 50.0<br>0 | 45.7<br>0 | | Excellent recovery. No adverse effect. |
| Simas | 2 lb. calcium lactate plus 1 lb. sodium lactate first day plus 1½ lb. calcium lactate daily for 4 days. | (G) 28.0<br>(K) 4 | 34.7<br>4 | 41.5<br>3 | 44<br>0 | Good recovery. No adverse effect. |

[1] Urine ketones were evaluated on basis of qualitative test with classification of 0 for no reaction to 4 for maximum ketones.

The above data shows that sodium lactate alone is effective but produces diarrhea. On the other hand, a mixture of calcium and sodium lactates in accordance with the invention containing equal weights of calcium and sodium lactates is equally effective without adverse effects. Sodium lactate alone cannot be used for a curative effect because the after effect produces a relapse which overcomes the initial favorable response. On the other hand, the mixture of calcium and sodium lactates produces an actual recovery without after effects.

The term "consisting essentially" as used in the claims means that the composition components named therein are the essential ingredients, and that there are and can be no components included in the composition that are not named which render the composition ineffective or deleterious or harmful in the treatment of bovine ketosis.

All percentages in the specification and claims are by weight.

We claim:

1. A composition for administration to bovine animals for the treatment of ketosis, consisting essentially of a lactobionate salt in an amount within the range from 15 to 30%, said lactobionate salt consisting of an amount within the range from about 15 to 100% of calcium lactobionate, and an amount within the range from about 85 to 0% of a member selected from the group consisting of sodium lactobionate and ammonium lactobionate, and from 70 to 85% of a lactate salt, said lactate salt consisting of amounts within the range from about 15 to 85% of calcium lactate and from about 85 to 15% of a member selected from the group consisting of sodium lactate and ammonium lactate, said composition having a pH in a 10% aqueous solution at 25° C. within the range from about 5 to about 6.

2. A composition for administration to bovine animals for the treatment of ketosis, consisting essentially of from about 15 to about 30% calcium lactobionate and from about 85 to about 70% calcium lactate, said composition having a pH in a 10% aqueous solution at 25° C. within the range from about 5 to about 6.

3. A composition for administration to bovine animals for the treatment of ketosis, consisting essentially of from about 15 to about 30% calcium lactobionate and from 85 to about 70% of a lactate salt mixture consisting of from about 15 to about 85% calcium lactate and from about 85 to about 15% sodium lactate, said composition having a pH in a 10% aqueous solution at 25° C. within the range from about 5 to about 6.

4. A composition for administration to bovine animals for the treatment of ketosis, consisting essentially of from about 15 to about 30% calcium lactobionate and from 85 to about 70% of a lactate salt mixture consisting of from about 15 to about 85% calcium lactate and from about 85 to about 15% ammonium lactate, said composition having a pH in a 10% aqueous solution at 25° C. within the range from about 5 to about 6.

5. A process for the treatment of ketosis in bovine animals which comprises administering a composition consisting essentially of a lactobionate salt in an amount within the range from 15 to 30%, said lactobionate salt consisting of an amount within the range from 15 to 100% calcium lactobionate and an amount within the range from 85 to 0% of a member selected from the group consisting of sodium lactobionate and ammonium lactobionate, and from 85 to 70% of a lactate salt consisting of an amount within the range from about 15 to 85% calcium lactate and an amount within the range from about 85 to 15% of a member selected from the group consisting of sodium lactate and ammonium lactate, said composition having a pH in a 10% aqueous solution at 25° C. within the range from about 5 to about 6.

6. A process for the treatment of ketosis in bovine animals which comprises administering orally a composition consisting essentially of a lactobionate salt in an amount within the range from 15 to 30%, said lactobionate salt consisting of an amount within the range from 15 to 100% calcium lactobionate and an amount within the range from 85 to 0% of a member selected from the group consisting of sodium lactobionate and ammonium lactobionate, and from 85 to 70% of a lactate salt consisting of an amount within the range from about 15 to 85% calcium lactate and an amount within the range from about 85 to 15% of a member selected from the group consisting of sodium lactate and ammonium lactate, said composition having a pH in a 10% aqueous solution at 25° C. within the range from about 5 to about 6.

7. A process in accordance with claim 5 which includes administering the composition admixed with a feed.

8. A process in accordance with claim 5 in which the composition is administered by drenching.

9. A feed for administration to bovine animals for the treatment of ketosis, consisting essentially of bovine nutrient materials and a composition in accordance with claim 1 in an amount within the range from 5 to 15%.

10. A feed for administration to bovine animals for the treatment of ketosis, consisting essentially of bovine nutrient materials and an amount within the range from 5 to 15% of a composition in accordance with claim 2.

11. A feed for administration to bovine animals for the treatment of ketosis, consisting essentially of bovine nutrient materials and an amount within the range from 5 to 15% of a composition in accordance with claim 3.

12. A feed for administration to bovine animals for the treatment of ketosis, consisting essentially of bovine nutrient materials and an amount within the range from 5 to 15% of a composition in accordance with claim 4.

References Cited in the file of this patent

UNITED STATES PATENTS 1,989,566   Stoll _____ Jan. 29, 1935

OTHER REFERENCES

Goodman: The Pharmacol. Basis of Therapeutics, 2nd ed., 1955, MacMillan Co., New York, N. Y., pp. 810 and 811.

Drug and Cos. Ind., vol. 69, No. 4, pp. 513, October 1951.

Hutyra: Pathology and Ther. of the Diseases of Domestic Animals, vol. III, 1938, pp. 445, 446 and 467–469, Alexander Eger, Chicago, Ill.

J. A. Vet. Med. Asso., vol. 122, No. 915, June 1953, p. 491.

Sollmann: A Manual of Pharmacology, 7th ed., 1948, p. 778, Saunders Co., Philadelphia, Pa.

UNITED STATES PATENT OFFICE
CERTIFICATE OF CORRECTION

Patent No. 2,856,327

October 14, 1958

Joseph C. Shaw et al.

It is hereby certified that error appears in the printed specification of the above numbered patent requiring correction and that the said Letters Patent should read as corrected below.

Column 3, line 9, for "of" read -- or --; column 4, line 5, for "preventive" read -- preventative --; column 5, line 40, Table I, third column thereof, in the heading, for "H$^2$0" read -- H$_2$0 --; column 7, line 21, for "inacetic" read -- in acetic --; column 8, line 21, after "studies" strike out "of"; columns 7 and 8, Table III, under the heading "Lactate Dosage", line 1, for "92 lbs." read -- 2 lbs. --; same Table III, fifth column thereof, under the heading "1", for "17.4" read -- 17.7 --; columns 7 and 8, Table IV, the heading should appear as shown below instead of as in the patent:

-- THREE COWS TREATED WITH COMBINATION OF CALCIUM LACTATE PENTAHYDRATE AND SODIUM LACTATE (Ca-Na RATIO 1:1) ON FIRST DAY AND EITHER A COMBINATION OR CALCIUM LACTATE THEREAFTER --.

Signed and sealed this 13th day of January 1959.

(SEAL)
Attest:
KARL H. AXLINE
Attesting Officer

ROBERT C. WATSON
Commissioner of Paten